(12) United States Patent
Buchan et al.

(10) Patent No.: US 7,196,016 B2
(45) Date of Patent: Mar. 27, 2007

(54) FABRICATION PROCESS FOR PREPARING RECORDING HEAD SLIDERS MADE FROM SILICON SUBSTRATES WITH $SiO_2$ OVERCOATS

(75) Inventors: Nicholas I. Buchan, San Jose, CA (US); Timothy C. Reiley, Cupertino, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 259 days.

(21) Appl. No.: 10/675,203

(22) Filed: Sep. 29, 2003

(65) Prior Publication Data

US 2005/0070118 A1  Mar. 31, 2005

(51) Int. Cl.
*H01L 21/302* (2006.01)

(52) U.S. Cl. ............. 438/712; 438/675; 438/705; 451/129; 361/764; 360/317; 324/158.1

(58) Field of Classification Search ......... 438/712, 438/717, 720, 722, 745, 725
See application file for complete search history.

(56) References Cited

U.S. PATENT DOCUMENTS

| | | | | |
|---|---|---|---|---|
| 4,589,952 | A | 5/1986 | Behringer et al. | 156/628 |
| 4,634,495 | A | 1/1987 | Gobrecht et al. | 156/643 |
| 4,698,708 | A | 10/1987 | Lazzari | 360/103 |
| 4,809,103 | A | 2/1989 | Lazzari | 360/103 |
| 4,965,702 | A * | 10/1990 | Lott et al. | 361/764 |
| 6,117,283 | A | 9/2000 | Chen et al. | 204/192.23 |
| 6,171,945 | B1 * | 1/2001 | Mandal et al. | 438/622 |
| 6,445,542 | B1 | 9/2002 | Levi et al. | 360/236.5 |
| 6,459,260 | B1 * | 10/2002 | Bonin et al. | 324/158.1 |
| 6,477,019 | B2 * | 11/2002 | Matono et al. | 360/320 |

(Continued)

FOREIGN PATENT DOCUMENTS

JP  52050711  4/1977

(Continued)

OTHER PUBLICATIONS

A five-layer film MCM-Si design oxynitride dielectrics; Jo Lemout; Alcatel Telecom; Antwerp, Belgium; 1998; p. 5.*

(Continued)

*Primary Examiner*—Lan Vinh
*Assistant Examiner*—Patricia A. George
(74) *Attorney, Agent, or Firm*—Larry B. Guernsey; Intellectual Property Law Offices

(57) ABSTRACT

A method for fabricating recording head sliders made from silicon substrates, is described. A Silicon wafer with a $SiO_2$ overcoat is provided, and a layer of material which is resistant to Deep Reactive Ion Etching (DRIE) is deposited on the $SiO_2$ overcoat. A patterned layer of material which is resistant to Reactive Ion Etching (RIE) is deposited on the layer of DRIE-resistant material to form a primary mask. RIE is used through the primary mask to pattern the $SiO_2$ overcoat layer and the layer of DRIE-resistant material. The primary mask is then removing to expose the layer of DRIE-resistant material which has now been patterned to form a secondary mask. DRIE is then used through the secondary mask to cut the Si wafer into pieces. Finally, the secondary mask is removed.

18 Claims, 3 Drawing Sheets

U.S. PATENT DOCUMENTS

| | | |
|---|---|---|
| 6,532,134 B1 | 3/2003 | Chen et al. .............. 360/235.2 |
| 6,556,380 B2 | 4/2003 | Bunch et al. ............ 360/235.1 |
| 6,686,280 B1 * | 2/2004 | Shue et al. ................. 438/675 |
| 6,776,690 B2 * | 8/2004 | Bunch et al. ................. 451/29 |
| 6,897,148 B2 * | 5/2005 | Halahan et al. ............. 438/678 |
| 6,989,331 B2 * | 1/2006 | Gopinath et al. ........... 438/705 |
| 7,027,269 B2 * | 4/2006 | Penning et al. ............. 360/317 |
| 2002/0094633 A1 * | 7/2002 | Iwasaki et al. ............. 438/240 |

FOREIGN PATENT DOCUMENTS

| | | | |
|---|---|---|---|
| JP | 60254731 | * | 5/1984 |
| JP | 62003476 | | 1/1987 |
| JP | 11144212 | | 5/1999 |

OTHER PUBLICATIONS

Producing Integrated Circuits with X-ray Lithography; ben Braun; 1998; p. 1.*

IBM Technical Disclosure Bulletin, Dec. 1982, "Sliders for Magnetic Heads of Surface Hardened Silicon with Integrated Electronic Components".

IBM Technical Disclosure Bulletin, Feb. 1984, "Silicon Magnetic Slider with Sapphire Rails".

IBM Technical Disclosure Bulletin, Jun. 1995, "Batch-Produced Sliders with Tapers and Processes for their Fabrication".

IEEE Transactions on Magnetics, vol. 34, No. 4, Jul. 1998, "A New Sub-Femto Slider for Mass Production Planar Silicon Heads" by J.P. Lazzari, C. Pisella and L. Tosi.

* cited by examiner

FABRICATION PROCESS FOR PREPARING RECORDING HEAD SLIDERS MADE FROM SILICON SUBSTRATES WITH SIO₂ OVERCOATS

BACKGROUND OF THE INVENTION

1. Field of the Invention

The present invention relates generally to fabrication of recording heads of disk drive assemblies, and more particularly to use of Deep Reactive Ion Etching in component fabrication.

2. Description of the Prior Art

Conventional magnetic recording head sliders are typically made from wafers of a two-phase ceramic, $TiC/Al_2O_3$, also called Al—TiC. After the thin film processing to prepare the recording heads is performed on the Al—TiC wafers, the sliders are then formed. The sliders are fabricated by cutting, grinding and lapping the wafer made of the above material. Normally, as shown in FIGS. 1–2C (Prior Art), the wafer 2 is first cut into pieces which are then cut into the slider bodies 4. The sliders bodies 4 are prepared by diamond sawing in three separate sawing steps: (i) coarse sawing to divide the wafer 2 into smaller pieces, called quadrants 6, (ii) row sawing to separate rows 8 of slider bodies 4 from the wafer quadrants 6; these rows 8 are then lapped, and (iii) slider separation sawing to separate the completed sliders 4 from the rows 8. This process has evolved considerably with time, but still suffers from inherent limitations associated with the diamond sawing process, such as the fairly wide 'kerf' needed for the passage of the blade, edge chipping, generation of surface damage, and generation of loosely-bound particles which may become dislodged in the disk drive. These limitations impact the number of heads which can be put on a finished wafer, the yield of acceptable finished sliders and the reliability of the disk drive itself.

An alternative processing approach is available for Si substrates. This is the process known as DRIE (Deep Reactive Ion Etching) which has been developed during the last 8 years, to give a technique, and associated commercially available tooling, which allows the very deep, high aspect ratio etching of Si. For example, material thicker than 1 mm has been etched with aspect ratios (ratio of depth of cut to width of cut) of about 20. This is a two-stage one process in which the material is etched for a few seconds and then passivated a few seconds, so that at the bottom of the trench being etched, the passivation is removed more rapidly than along the adjacent trench walls, thereby focusing the etching action at this point during the etch cycle. DRIE tools are common, commercially, and are used in fabricating MEMS (Micro Electromechanical Systems) structures, such as Si-based accelerometers.

Thus there is a need for a fabrication which does not have the disadvantages discussed above caused by mechanical methods of separation such as sawing.

SUMMARY OF THE INVENTION

A method for fabricating recording head sliders made from silicon substrates, is described according to the preferred method of the present invention. A Silicon wafer with a $SiO_2$ overcoat is provided, and a layer of material which is resistant to Deep Reactive Ion Etching (DRIE) is deposited on the $SiO_2$ overcoat. A patterned layer of material which is resistant to Reactive Ion Etching (RIE) is deposited on the layer of DRIE-resistant material to form a primary mask. RIE is used through the primary mask to pattern the $SiO_2$ overcoat layer and the layer of DRIE-resistant material. The primary mask is then removing to expose the layer of DRIE-resistant material which has now been patterned to form a secondary mask. DRIE is then used through the secondary mask to cut the Si wafer into pieces. Finally, the secondary mask is removed The present invention thus produces flat-faced, smooth slider bodies which may be of higher yield and number from a single wafer than can be produced by conventional sawing methods.

It is an advantage of the present invention that sliders can be separated without the wide 'kerf' needed for the passage of the blade in conventional sawing, thus allowing higher densities of sliders on a single wafer.

It is another advantage of the present invention that edge chipping associated with conventional sawing methods is reduced, thus producing higher yields.

It is a further advantage of the present invention that surface damage associated with conventional sawing methods is reduced, thus producing higher yields.

It is yet another advantage of the present invention that there is decreased generation of loosely-bound particles which may become dislodged in the disk drive than in past methods. It thus requires less processing to clean up stray particles, and produces higher yields of acceptable finished sliders and improves the reliability of the disk drive itself.

It is another advantage of the present invention that there is less irregularity to cut surfaces, so that less polishing and lapping is required at various stages in the manufacturing process, thus producing higher throughput.

A further advantage of the present invention is that it allows the patterning and etching of the slider bodies using only one photo-masking step.

An additional advantage of the present invention is that it also avoids the redeposition of non-volatile, etching reaction products which generally occurs when conventional photo-resist is used for the RIE processing of oxides.

Yet another advantage of the present invention is that the manufacturing process is simplified, requiring fewer stages of handling, and fixturing, so that the process is more efficient.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
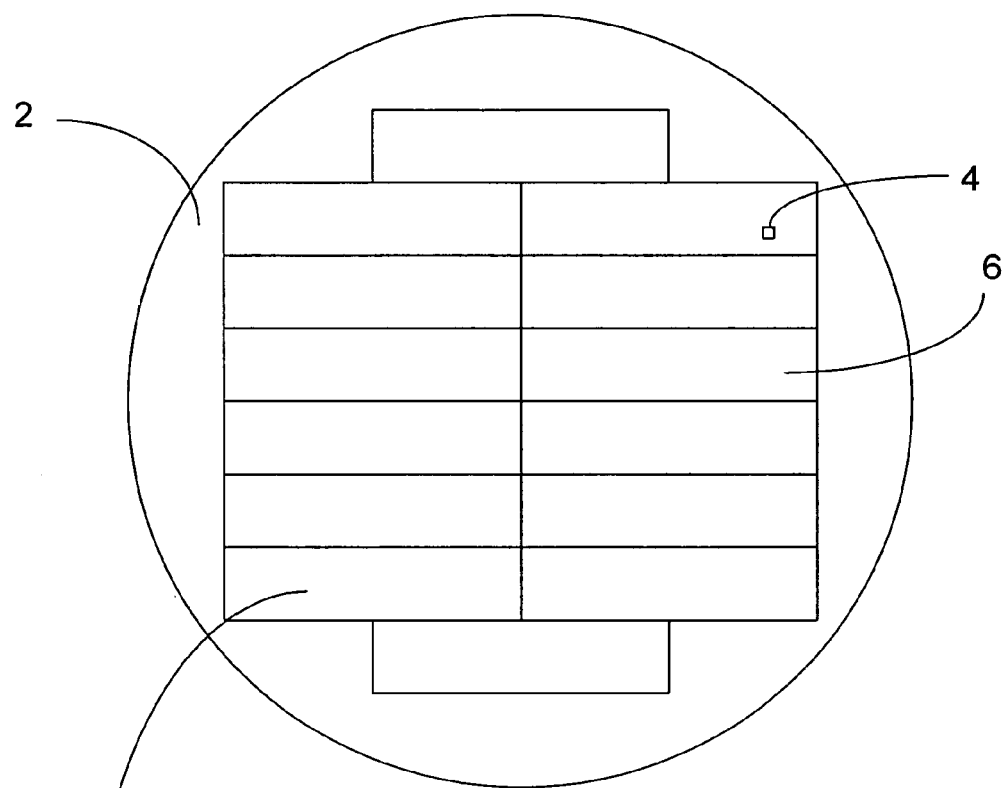
FIG. 1 is a front plan view of a wafer as known in the prior art.
Figure 2A:
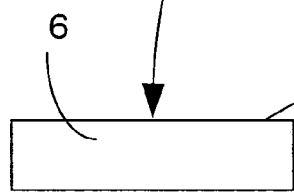
FIGS. 2A–2C show front plan views of the stages in the fabrication of slider bodies as known in the prior art.
Figure 2B:
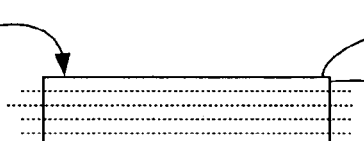
Figure 2C:
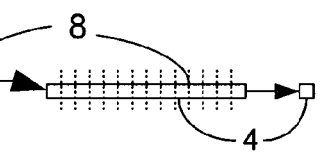

Approaches are being considered in which materials other than the current standard material ($Al_2O_3$+TiC ceramic, or N58) are used as the substrate for building magnetic recording heads. The options are many, but a primary choice is the use of Si as the alternate substrate material and its oxide, $SiO_2$, for the thick overcoat material which covers the recording head electrical structure and for other insulating layers within the head. There are numerous and diverse advantages for choosing Si, but a substantial one is the ease with which slider bodies, containing the recording head, can be prepared from the finished wafer. The choice of $SiO_2$ as the overcoat material is advantageous with respect to the currently used material, sputtered $Al_2O_3$. From the slider fabrication perspective, a great advantage is that it can be dry-etched in a Reactive Ion Etching (RIE) tool. The use of RIE to etch $SiO_2$ has been practiced for many years, and dedicated tools are available for this purpose. The RIE processing of $SiO_2$ is much more convenient than that used presently for $Al_2O_3$ because the reaction product for $SiO_2$, SiF4, is volatile, whereas the Al—F compounds are not volatile in the available temperature range. For $Al_2O_3$, the RIE process is much more like a sputter-etch process wherein energetic ions bombard the surface to physically sputter away the $Al_2O_3$. Furthermore, the wall angle which can be achieved in $SiO_2$ by the RIE process is much steeper than that for $Al_2O_3$.

The process disclosed here is one which is particularly compatible with the materials and process set used in the fabrication of magnetic recording heads. It allows the patterning and etching of the slider bodies using only one photo-masking step. It also avoids a particular problem observed when conventional photoresist is used for the RIE processing of oxides. Redeposition of non-volatile, etching reaction products can occur. This redeposited material is some tenacious combination of the $SiO_2$, mask material and the chemical byproducts of their interactions with the reaction gas. For example, the redeposition generated using hydrocarbon resist and fluorine-based etching gases is extremely difficult, if not impossible, to remove within the chemical, mechanical and thermal constraints for finished recording head sliders.

When the substrate and overcoat choices are Si and $SiO_2$, respectively, the following procedure allows minimal processing to the finished wafer, and allows an effective RIE process of the $SiO_2$ overcoat and Deep Reactive Ion Etching (DRIE) process of the Si substrate to produce flat-faced, smooth slider bodies.

Generally, first, the RIE mask for $SiO_2$ is chosen as pattern-plated Ni—Fe (ranging from roughly 0 to 100% Ni). Ni has been shown to function as a very high selectivity mask for $SiO_2$ (see Massimi, et al, Jpn. J. Appl. Phys., 38 (1999) pp 6150–6153). It has been observed that very little or no redeposition is associated with Ni—Fe masking of $SiO_2$ during RIE. Any redeposition which is generated is removed along with the Ni—Fe mask during a chemical etch step.

The high etch selectivity seen for RIE of Si has also been observed in the use of Ni—Fe masks during the DRIE of Si. It would be quite advantageous to be able to use a single mask of Ni—Fe for both the RIE and DRIE processes. However, this is not workable because the DRIE process is slowed down by having small amounts of Ni—Fe mask sputtered on the walls being etched, thereby poisoning the etch process substantially and changing the planarity of the etched walls. It is necessary to find an intermediate material, other than Ni—Fe to use for the DRIE process after RIE of the $SiO_2$. One possibilty is to use a hydrocarbon resist beneath the Ni—Fe, which upon removal of the Ni—Fe, can be used as the DRIE mask. The thickness of resist required to last through the etch of the 1.2 mm of Si substrate is about 60 µm. This would require that the patterned Ni—Fe be used as an etch mask for the patterning of the resist, as well as the $SiO_2$ overcoat. Thus, two distinct etching processes would be needed to reach the Si surface, making this a less desirable process. In addition, a manufacturable process for resist stripping has not been demonstrated; tenacious residues are often observed.

A better intermediate material has been found, which is also among the materials set used for recording head manufacture. It has been shown that $Al_2O_3$ can be used as an acceptable material for a DRIE mask; it does not measurably retard or alter the DRIE process. However, it will be noted that these other variations have been contemplated and are all encompassed by the present invention.

Figure 3:
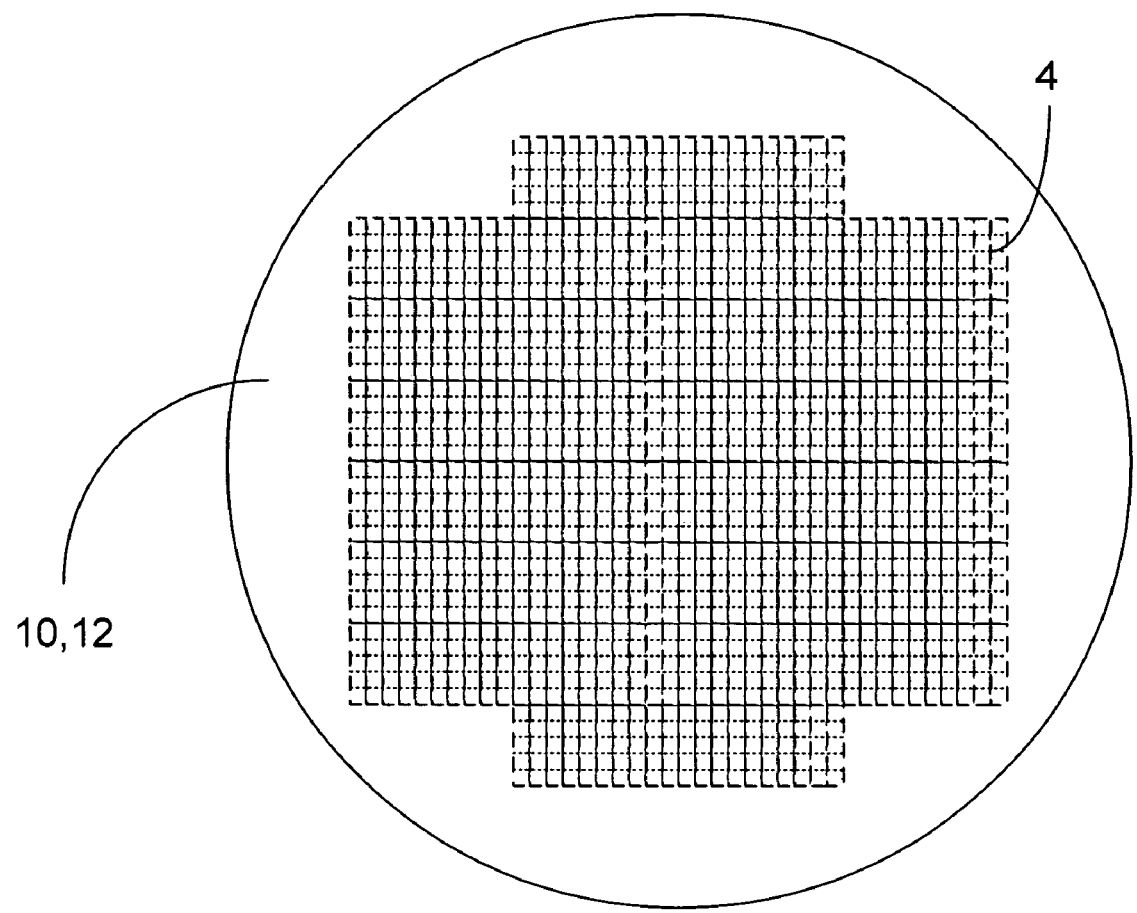
FIG. 3 shows a wafer which is cut by using the present method of fabrication.

FIG. 3 shows a silicon wafer 10 having a $SiO_2$ overcoat layer 12, which is to be cut into slider bodies 4 using the present method. This will result in all the pieces being separated during the DRIE process at the same time, rather than being cut into quadrants, lapped and polished, cut into rows, lapped and polished and then cut into individual pieces and lapped and polished further as in the prior art, thus requiring much less handling and processing time, as well as improving yields.

The process for the masking and etching procedure for the fabrication of sliders from a Si+$SiO_2$ wafer is shown in FIGS. 4–8, which are a series of cross-sectional views showing the various layers during the stages of the fabrication process. In the following discussion, preferred dimensions for the applied layers are suggested, but are not to be construed as a limitation. Also, no attempt has been made to draw the layer thicknesses in proper scale with each other. Reference is made to all of FIGS. 4–8 in the following discussion.

Figure 4:
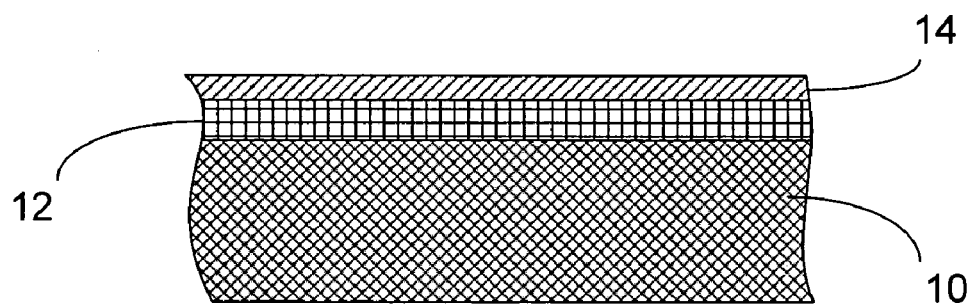
FIGS. 4–8 show cross-sectional views of the stages in the fabrication of slider bodies using the present method of fabrication.

The Si wafer 10 is provided and the $SiO_2$ layer 12 is deposited, followed by a layer of DRIE-resistant material 14, preferably sputtered $Al_2O_3$, as shown in FIG. 4. The thickness of this DRIE-resistant layer 14 is preferably 1.5 µm ($1.5 \times 10^{-6}$ meters).

Figure 5:
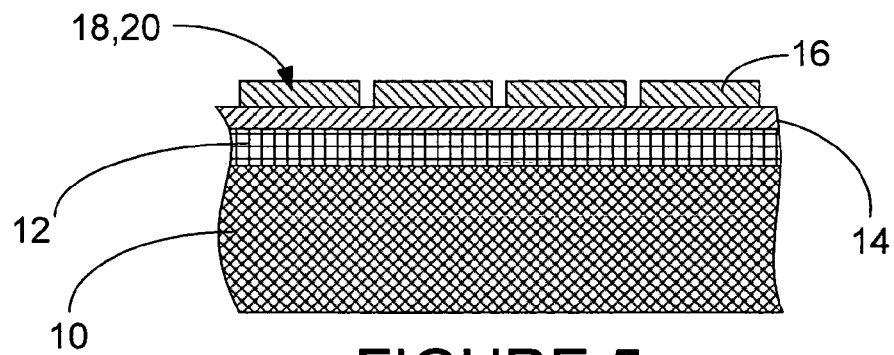
Figure 6:
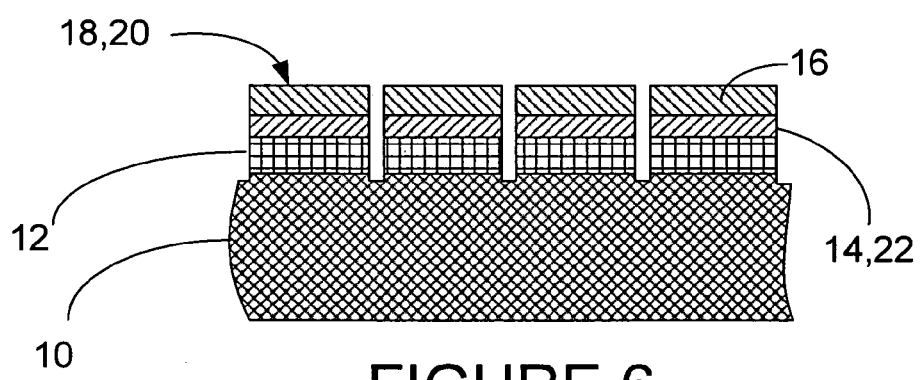

Next, a layer of material that is resistant to RIE 16, preferably a metal, such as NiFe, is deposited as a seedlayer (not shown) to allow the electroplating of the primary masking metal layer, which will follow. Photo-resist (also not shown) is then applied, exposed and developed to allow pattern-plating to cover the slider areas, and the pattern-plated layer of RIE-resistant material 16 is applied to a depth of preferably about 2 µm. The photo-resist is then stripped, producing the primary mask 18, which may also be referred to as an RIE mask 20. This structure is shown in FIG. 5. NiFe is used as an example here, but any metal, especially any of the transition metals, (i.e. Sc—Zn on the periodic table) can be used. Of these, Cu has also proved especially useful.

Next, Reactive Ion Etching (RIE) is used to remove material which is not protected by the primary mask 18. The primary mask 18 thus reproduces its pattern in the underlying layers, namely the 1.5 µm DRIE-resistant layer 14 plus the 30–40 µm $SiO_2$ overcoat layer 12, and possibly a bit of the Si layer 10 itself, producing the structure shown in FIG. 6. Part of the pattern which is reproduced from the primary mask 18 into the underlying layers will become a secondary mask 22, which has now been formed in the DRIE-resistant layer 14.

Optionally, the masking metal seedlayer is sputter etched away before the RIE process above, but it is also possible that this seedlayer may be removed during the RIE process, since it is so thin.

Figure 7:
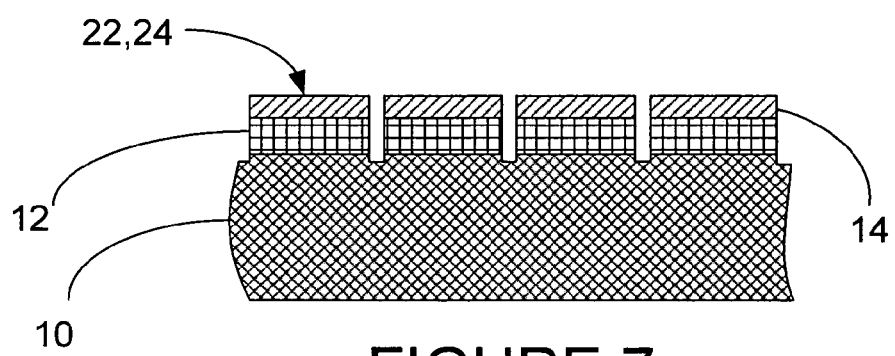

The masking metal layer is then selectively removed by wet-etching which leaves the DRIE-resistant layer 14, now the secondary mask 22, intact. This secondary mask 22 is used for the Deep Reactive Ion Etching (DRIE) process which follows and may also be referred to as a DRIE mask 24. The structure of the layers just before the DRIE process commences is shown in FIG. 7.

Figure 8:
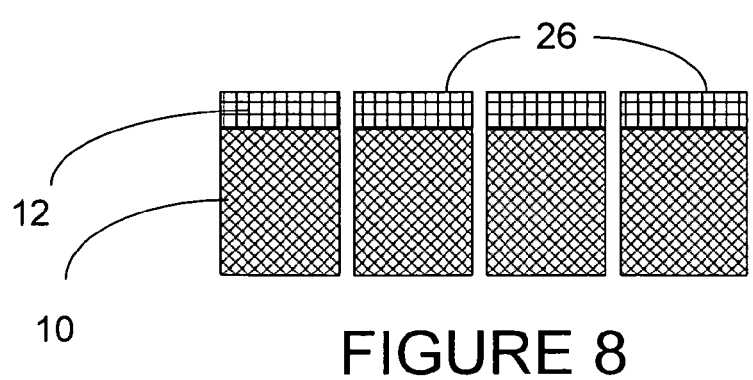

The remaining DRIE-resistant layer is then used to mask the underlying layers 10, 12 from the DRIE. The Si wafer 10 is cut completely through, and the DRIE-resistant layer (now not shown) is then removed using wet etching. The sliders 26 are thus separated from each other without the use of sawing, and also without the lapping previously required to remove the saw abrasions from the pieces. The separated sliders 26 are shown in FIG. 8.

The present invention thus produces flat-faced, smooth slider bodies which may be of higher yield and number from a single wafer than can be produced by conventional sawing methods.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method for fabricating recording head sliders made from silicon substrates with $SiO_2$ overcoats, comprising:
    A) providing a Si wafer which has been fabricated with a $SiO_2$ overcoat;
    B) depositing a layer of DRIE-resistant material on said $SiO_2$ overcoat, wherein said DRIE-resistant material is $Al_2O_3$;
    C) depositing a patterned layer of RIE-resistant material on said layer of DRIE-resistant material to form a primary mask;
    D) etching by RIE through said primary mask to pattern said $SiO_2$ overcoat layer and said layer of DRIE-resistant material;
    E) removing said primary mask to expose said layer of DRIE-resistant material which has now been patterned to form a secondary mask;
    F) etching by DRIE through said secondary mask to cut said Si wafer into pieces; and
    G) removing said secondary mask.

2. The method of fabrication of claim 1, wherein:
said RIE-resistant material is a metal.

3. The method of fabrication of claim 1, wherein:
said RIE-resistant material is a transition metal.

4. The method of fabrication of claim 1, wherein: said RIE-resistant material is chosen front the group consisting of Cu, NiFe, and transition metals.

5. The method of fabrication of claim 1, wherein:
    said C) depositing a patterned layer of RIE-resistant material on said layer of DRIE-resistant material to form a primary mask comprises;
    i) applying, exposing and developing photoresist to create the pattern;
    ii) plating the layer of RIE-resistant material into the photo-resist pattern; and
    iii) stripping the photo-resist.

6. The method of fabrication of claim 5, wherein said C) depositing a patterned layer of RIE-resistant material on said layer of DRIE-resistant material to form a primary mask further comprises:
    applying a seed layer of RIE-resistant material before applying said photoresist.

7. The method of fabrication of claim 6, wherein:
    said D) etching by RIE further comprises:
        first sputter-etching away said seed layer of RIE-resistant material before RIE.

8. The method of fabrication of claim 1, wherein:
    said E) removing said primary mask is done by selective wet etching.

9. The method of fabrication of claim 1, wherein:
    said F) removing said secondary mask is done by selective wet etching.

10. A method for fabricating recording head sliders made from silicon substrates, comprising:
    A) producing a $SiO_2$ overcoat on said Si wafer,
    B) depositing a layer of DRIE-resistant material on said $SiO_2$ overcoat, wherein said DRIE-resistant material is $Al_2O_3$;
    C) depositing a RIE mask on said layer of DRIE-resistant material;
    D) etching by RIE through said RIE mask to pattern said $SiO_2$ overcoat layer and form a DRIE mask from said DRIE-resistant material;
    E) removing said RIE mask to expose said DRIE mask;
    F) etching by DRIE through said DRIE mask to cut said Si wafer; and
    G) removing said DRIE mask.

11. The method of fabrication of claim 10, wherein:
said RIE-resistant material is a metal.

12. The method of fabrication of claim 10, wherein:
said RIE-resistant material is a transition metal.

13. The method of fabrication of claim 10, wherein:
said RIE-resistant material is chosen from the group consisting of Cu, NiFe, and transition metals.

14. The method of fabrication of claim 10, wherein:
    2 C) depositing a RIE mask on said layer of DRIE-resistant material comprises;
    i) applying, exposing and developing photoresist to create the pattern;
    ii) plating the layer of RIE-resistant material into the photo-resist pattern; and
    iii) stripping the photo-resist.

15. The method of fabrication of claim 14, wherein:
    C) depositing a RIE mask on said layer of DRIE-resistant material further comprises:
    i) applying a seed layer of RIE-resistant material before applying said photoresit.

16. The method of fabrication of claim 15, wherein:
    said D) etching by RIE further comprises:
        first sputter-etching away said seed layer of RIE-resistant material before RIE.

17. The method of fabrication of claim 10, wherein:
said E) removing said RIE mask is done by selective wet etching.

18. The method of fabrication of claim 10, wherein:
said F) removing said DRIE mask is done by selective wet etching.

* * * * *